Figure 1:
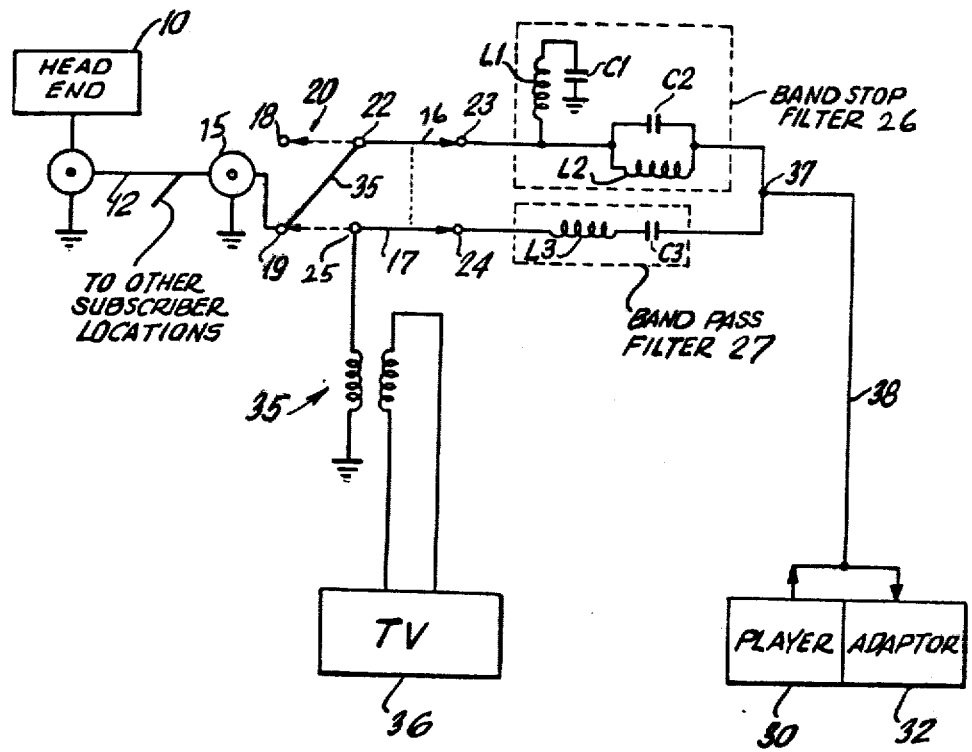

United States Patent [19]

Glaab et al.

[11] 4,312,016
[45] Jan. 19, 1982

[54] TELEVISION SIGNAL SWITCHING APPARATUS

[75] Inventors: Joseph B. Glaab, New Hope; Michael F. Jeffers, Flourtown, both of Pa.

[73] Assignee: Jerrold Electronics Corporation, Hatboro, Pa.

[21] Appl. No.: 9,286

[22] Filed: Feb. 2, 1979

[51] Int. Cl.³ ............................................. H04N 5/44
[52] U.S. Cl. .................................. 358/188; 358/181
[58] Field of Search ................ 358/188, 181, 83, 93, 358/142, 86

[56] References Cited

U.S. PATENT DOCUMENTS 4,109,280 8/1978 Dash ................................. 358/188

*Primary Examiner*—Richard Murray
*Attorney, Agent, or Firm*—Stephen B. Judlowe

[57] ABSTRACT

Switching apparatus for selectively applying either video game signals or conventional television program signals to a television receiver includes a pair of complementary filters to respectively pass and block the transmission of signals within a selected game-display channel. A switch may be selectively placed in either a game-playing mode or a program-receiving mode. In the latter mode the switch connects an input cable to the receiver. Correspondingly, when used for video games, the switch passes the incoming cable signal through one of the filters to a video game-playing adaptor and player which, in turn, are connected back to the receiver through the other of the filters.

6 Claims, 2 Drawing Figures

TELEVISION SIGNAL SWITCHING APPARATUS

DISCLOSURE OF THE INVENTION

The present invention relates generally to electronic television games, and more particularly to improved switching apparatus for selecting video game operation or conventional television programs for viewing on a television receiver.

In recent years there has been a significant increase in the popularity and use of electronic video games, which are played on the screen of a conventional television receiver. For this purpose, the receiver is tuned to a normally unused channel and game indicia, such as movable players and/or the like, are displayed on the screen. In one common form, these games include a player console, which includes one or more user actuated controls allowing the player(s) to vary the position of the displayed game indicia on the television sreen. In other forms, interactive or passive, displays of other significance are presented by the television receiver.

The variety and complexity of electronic video games have both been increased by the use of a microprocessor in the game player console, which is used in conjunction with any of a large number of pre-programmed memories each of which contains the program instructions for a different video game. By replacing one pre-programmed memory with another, a completely new game with a new format and display indicia may be played from the player console. With these games, however, it is necessary for the player to purchase a new memory for each of the games to be played. Since these memories are conventionally read-only (ROM's), they can only be used for a single game.

To overcome the need for purchasing and maintaining a separate pre-programmed memory for each video game which the viewer wishes to play with the conventional multi-game video system, it has been proposed to transmit a multiplexed ensemble of game-playing instruction signals (as via a CATV or MATV coaxial cable) to a plurality of subscriber locations, together with conventional television programming material. Such systems are disclosed in a previously filed application Ser. No. 895,809 filed Apr. 12, 1978 and an application Ser. No. 8,264 filed on Feb. 1, 1979, assigned to the same assignee as the present application, the disclosures of which are incorporated herein by reference. Each of the suscriber locations is provided with a random-access memory (RAM) and associated circuitry to permit the data for a selected one of the transmitted video games to be demodulated and then entered into the RAM. The RAM-stored program is then used in conjunction with the player console and microprocessor to play the selected video game according to the format dictated by the RAM contents. When the subscriber decides to select another one of the transmitted video games for subsequent play, the RAM is reprogrammed by loading new game data derived from another of the ensemble of such game signals transmitted on the cable to the subscriber's location. In this manner, the subscriber may, at his option, play a desired one of a plurality of video games or make use of special programs with the use of only a single RAM, and without the need for him to acquire a new pre-programmed memory for each electronic video game he wishes to play.

Although the proposed video game transmission system as disclosed in said previously filed and other application considerably expands the number of different television games available to the home subscriber, without the need to acquire separate programmed memories for each of these games, the proposed arrangement requires the use of plural (e.g., three) separate coaxial cables at each subscriber location to effect the desired transmission paths between the head end cable, the video game console and adaptor, and the television receiver. The need for these plural cables increases the cost and complexity of the system, and also increases the likelihood of system malfunction as a result, for example, of a loose cable connection.

It is therefore, an object of the invention to provide in a television game distribution system improved subscriber location switching apparatus that requires only a single coaxial cable to effect the desired signal transmission paths.

It is a further object of the present invention to provide switching apparatus of the type described which is less complex, less costly, and more reliable than conventional switching apparatus for this use.

In accordance with the present invention, switching apparatus includes a pair of complementary filters, one of which passes only the game-viewing channel and the other of which blocks the game-viewing channel. A switching device selectively connects or disconnects the filters between the head end cable, video game adaptor, and a television receiver depending on whether the subscriber wishes the receiver to play a selected one of the transmitted video games or to view a standard television program. In the embodiments of the invention specifically described, the switching device is in the form of a double-pole, double-throw switch.

Figure 2:
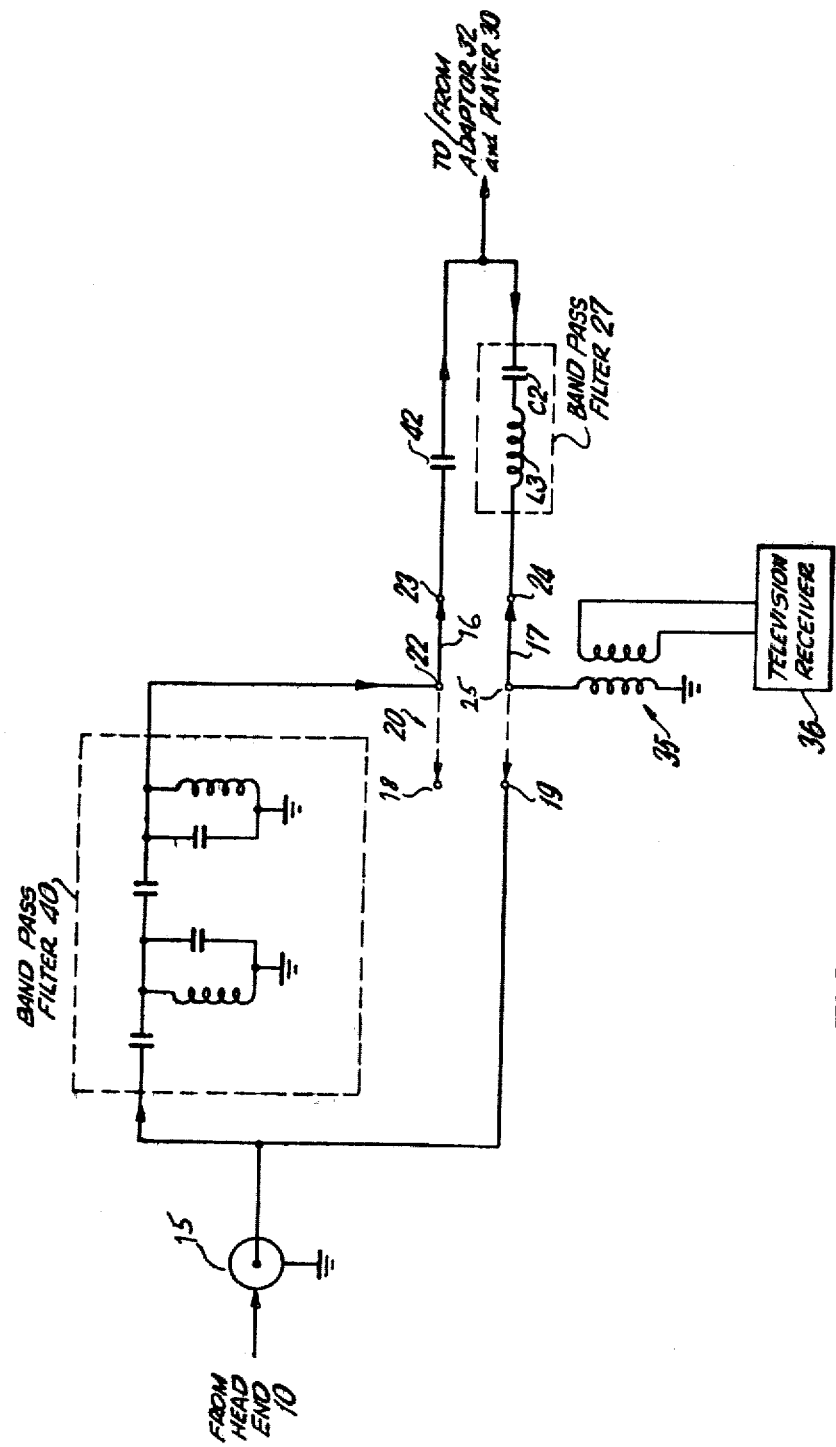

To the accomplishment of the above and to such further objects as may hereinafter appear, the present invention relates to a television signal switching apparatus substantially as defined in the appended claims and as described in the following detailed specification, as considered with the accompanying drawing in which:

FIG. 1 is a schematic diagram of a first embodiment of a television signal switching apparatus according to the principles of the present invention; and FIG. 2 is a second embodiment of switching apparatus of the instant invention.

Referring first to the FIG. 1 embodiment, there is shown switching apparatus permitting a viewer, for example a subscriber to a cable television (CATV or MATV) distribution system, to view on a conventional television receiver 36 one of an ensemble of standard programs, video games, or other visual presentations transmitted to the subscriber location from a head end equipment or transmitter location 10.

Head end equipment 10 impresses upon a suitable video signal distribution medium, such as a coaxial cable 12, conventional television programs on separate channels (frequency spectra), along with an ensemble of multiplexed digital programs each of which contains the requisite program instructions to implement a particular television game. The game-controlling program may advantageously be serially time division multiplexed onto the cable 12 in an assigned game frequency band, which is frequency division multiplexed with the other video signals, such as conventional television programs, which are also impressed on the cable.

For standard television reception without the use of a frequency converter, the conventional television programs are transmitted in the normal VHF channel bands, and the television game instructions transmitted elsewhere, e.g., within the spectrum of a locally unused channel, in the inter-channel 6–7 midband range, or in a sub-band or superband channel. Where a converter is employed along with the television receivers, the frequency of the conventional television programs may be of any rearranged frequency assignment.

The cable 12 is connected to a plurality of subscriber locations, one of which is shown in the figure, it being understood that all other subscriber locations for the cable transmission system are substantially identical to the one shown. Thus, as shown, the subscriber location includes a coaxial terminal 15 connected to one terminal 19 of a switching element 20, here shown in the form of a double-pole, double-throw switch, which includes additional contacts 18, 22, 23, 24 and 25. Switch 20 also includes contact arms 16 and 17, which are shown in solid lines in the game-mode of operation, and in broken lines in the television program-mode, as more completely described below. Terminals 19 and 22 are connected to one another by a conductor 35, irrespective of the switching state of switch 20.

Contacts 23 and 24 of switch 20 are respectively connected to one end of a pair of complementary filters 26 and 27, which are connected at their other ends via a circuit point 37 and a single coaxial cable 38 to a combined game player 30 and an adaptor 32. Since a representative player 30 and adaptor 32 are described in detail in the application Ser. No. 8,264 filed on Feb. 1, 1979, the specification of which is incorporated by reference herein, they are described only briefly here.

The player 30-adaptor 32 unit includes apparatus for the subscriber (when switch 20 is in the game-mode or solid line position) to select one of the digital game program signals from the multiplexed ensemble of such signals transmitted from the head end 10, and circuitry to demodulate those signals and to load a RAM with the digital game instruction signals obtained by the demodulation of the received digital program signal. Once stored in this manner, the RAM provides the format and instructions for the selected video game, the playing of which is controlled at the player console 30 and viewed on the television receiver 36 when switch 20 is in the game-playing mode.

Filter 26 is a band-stop or notch filter designed to reject all signals within the frequency band of the channel (e.g., Channel 3) in which the game signals are transmitted along cable 38 from player 30 to the receiver 36 for viewing. To this end, filter 26 may illustratively include an inductance L1 connected in series with a capacitor C1 to ground, and an inductance L2 in parallel connection with a capacitor C2. Filter 27 may be regarded as the complement to filter 26 as it forms a band-pass filter to pass only signals at frequencies within the game-viewing channel. To this end, filter 27 includes an inductance L3 connected in series with a capacitor C3. It is further noted that filter 26 may be implemented by a band pass filter passing only the cable 12 game frequency band (thus rejecting the channel 3 or like spectrum. See in this regard the embodiment of FIG. 2 below discussed.

The television receiver 36 is coupled to the transmission cable and the switching apparatus by any suitable means, herein shown in the form of a balun transformer 35 having an input winding connected between switch contact 25 and ground, and a balanced output winding connected to the antenna terminals of the television receiver 36.

In operation, when the subscriber wishes to view a conventional television program on receiver 36, the selector switch 20 is placed in the standard television program (broken line) mode in which arms 16 and 17 are respectively moved into connection with contacts 18 and 19. In this condition of switch contacts 18 and 25, the standard radio frequency program ensemble pass from cable 12 to the balun 35, whereby the television signal is applied to the receiver 36. One of the television programs is then viewed by selecting one of the normal receiving channels as is conventional. It will be noted that in this condition of switch 20, the free ends of filters 26 and 27 are both unconnected such that the video game portion of the system, player 30 and adaptor 32, is disconnected from the cable terminal 15 and also from receiver 36.

On the other hand, when the subscriber wishes either to reprogram the RAM within adaptor 32 or to play one of the ensemble of transmitted video games, the selector switch 20 is placed in the game-playing solid-line position in which arms 16 and 17 respectively make contact with contacts 23 and 24. In this condition of switch 20, cable terminal 15 is connected to one end of notch filter 26 through contacts 19, 22 and 23, and the input winding of balun 35 is connected to one end of filter 27 through contacts 24 and 25.

When selector switch 20 is in this condition, the ensemble of input television and game signals (in a frequency band other than that of the output of player 30) are applied to the game adaptor-player unit 30, 32 through filter 26 and cable 38. The desired game signal is selected from the multiplexed ensemble of incoming signals and decoded in the adaptor 32 to load the RAM which, in combination with the operation of the player 30, controls the production and movement of symbols on receiver 36 in a manner described in greater detail in said contemporaneously filed application. These game signals are transmitted within a normally unused channel, e.g., channel 3, through the same cable 38 and through filter 27 to the balun input winding and then to the television receiver on which the game indicia are displayed and moved on the television screen in accordance with the operation of player 30 in a per se known manner.

Since filter 26 blocks all signals within the game-playing channel, none of the game signals on cable 38 generated by player 30 are transmitted back to the cable head end terminal 15 during operation of the apparatus in the game-playing mode. Further, filter 27 passes only the game channel to the television receiver through balun 35. The use of only a single coaxial cable 38, to connect the subscribe game-playing unit 30, 32 to the cable terminal and to the television receiver in a game-playing mode is thus made possible by the provision of the complementary filters 26 and 27, both of which are centered about the game-playing channel.

Referring now to FIG. 2, there is shown a second illustrative embodiment of the present invention closely paralleling that of FIG. 1 in structure and functioning. Like reference numerals designate like elements in FIGS. 1 and 2 and, moreover, FIG. 2 simply schematically illustrates connections from the apparatus shown to the head end, and to the player-adaptor 30, 32. In the FIG. 2 arrangement, a band pass filter 40 is employed to pass the game instruction channel (only) received from the head end via cable 12 to the player-adaptor 30, 32 via a capacitor 42 when the switch 20 is in the game playing position shown in FIG. 2. As before, the game video information output from player 30, at a locally unused VHF channel frequency band, for example that of Channel 3, passes through the band pass filter 27 to television receiver 36 via switch 20 arm 17 and the balun 35. One purpose of the band pass filter 40 (in common with filter 26 of FIG. 1) is to block anything on the cable 12 in the game playing frequency band (Channel 3 assumed above) from arriving at the balun 35 via a sneak path comprising switch 20, capacitor 42 and band pass filter 27 (the game playing frequency being specifically outside the pass band of filter 40). All remaining functioning is similar to that of FIG. 1 above discussed.

It will thus be appreciated that the novel television signal switching apparatus of the invention provides reliable switching and operation in either a television program or video game-playing mode with the use of only a single coaxial cable between the cable terminal, television receiver, and game-playing adaptor and player console. It will also be understood that modifications to the embodiment of the invention specifically described hereinabove, such as changing the game-playing channel and thus the respective operation frequencies of filters 26, 27 and 40, may be made without departing from the spirit and scope of the invention. Also, for example, band stop and pass filters 26, 27 and 40 may be formed of any active or passive filter organization well known to those skilled in the art.

What is claimed is:

1. In combination in television game switching apparatus, circuit terminal means for receiving a signal ensemble including at least one standard television program and at least one video game program instruction set, said program instruction set signal component occupying a predetermined frquency band, a cable, a television game player connected to one end of said cable and adapted to supply said cable with a video game radio frequency signal in a game video frequency band distinct from said predetermined frequency band, adaptor means connected to said cable one end for receiving said video game program instruction set signal component and for storing said program instruction set signal, output terminal means adapted for connection to a standard television receiver, and switching and filter means connecting said circuit terminal means, output terminal means and a second end of said cable, said switching and filter means including means for connecting said circuit terminal means and said output terminal means when said switching means resides in a first state, said switch and filter means further including first filter means for blocking said game video frequency band and for passing said instruction set predetermined frequency band connecting said circuit terminal means and said second cable end and game video passing means connecting said output terminal means and said second cable end when said switching means resides in a second state.

2. A combination as in claim 1 wherein said game video passing means comprises a series pass filter tuned to said game video frequency.

3. A combination as in claim 1 or 2 further comprising a television receiver, and means connecting said television receiver and said output terminal means.

4. A combination as in claim 1 or 2 wherein said switching and filter means includes a double-pole double-throw switch.

5. A combination as in claim 1 wherein said first filter means comprises a band pass filter tuned to said predetermined frequency band for passing said video program instruction set.

6. A combination as in claim 1 wherein said first filter means comprises a band stop filter tuned to said game video frequency band.

* * * * *